United States Patent
Muthu et al.

(10) Patent No.: US 8,795,888 B2
(45) Date of Patent: *Aug. 5, 2014

(54) AQUEOUS CO-POLYMER BINDER FOR LI-ION BATTERY

(75) Inventors: Milburn Ebenezer Jacob Muthu, Breinigsville, PA (US); Jacob Benjamin Behler, Allentown, PA (US)

(73) Assignee: Bren-Tronics Batteries International, L.L.C., Commack, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/296,742

(22) Filed: Nov. 15, 2011

(65) Prior Publication Data

US 2012/0058400 A1  Mar. 8, 2012

Related U.S. Application Data

(63) Continuation of application No. 12/701,001, filed on Feb. 5, 2010, now Pat. No. 8,076,026.

(51) Int. Cl.
*H01M 4/62* (2006.01)

(52) U.S. Cl.
USPC .......................................... 429/217; 429/212

(58) Field of Classification Search
USPC .............. 429/217, 212, 231.1, 223, 332, 224, 429/232, 231.3, 324, 218.1; 428/474.4; 524/566

See application file for complete search history.

(56) References Cited

U.S. PATENT DOCUMENTS

| | | | |
|---|---|---|---|
| 6,811,911 B1 * | 11/2004 | Peled et al. | 429/499 |
| 8,076,026 B2 * | 12/2011 | Muthu et al. | 429/217 |
| 2005/0238958 A1 * | 10/2005 | Kim | 429/217 |
| 2011/0081564 A1 * | 4/2011 | Choi et al. | 429/62 |

FOREIGN PATENT DOCUMENTS

| | | | | |
|---|---|---|---|---|
| JP | 2008-117673 | * | 5/2008 | H01M 4/06 |
| WO | WO 94/13781 | * | 6/1994 | C12N 1/00 |
| WO | WO 2008/123143 | * | 10/2008 | H01M 4/62 |

* cited by examiner

*Primary Examiner* — Raymond Alejandro
(74) *Attorney, Agent, or Firm* — Keusey & Associates, P.C.

(57) ABSTRACT

A battery having an electrode mix comprising water, a conductive additive and a poly(acrylonitrile-co-acrylamide) co-polymer as a binder. The use of poly(acrylonitrile-co-acrylamide) co-polymer eliminates the need for a separate thickener.

15 Claims, 4 Drawing Sheets

AQUEOUS CO-POLYMER BINDER FOR LI-ION BATTERY

CROSS REFERENCE TO RELATED APPLICATIONS

This application is a continuation of U.S. patent application Ser. No. 12/701,001, filed Feb. 5, 2010, now issued as U.S. Pat. No. 8,076,026.

FIELD OF INVENTION

The present invention relates to a water soluble binder for use in a rechargeable lithium ion battery and the battery in which the binder is used.

BACKGROUND

Rechargeable batteries use polymer binders to hold together the active particulate material and adhere this particulate material to the current collector in the fabrication of electrodes. The binder is generally comprised of one or more polymers. The binders commonly used in commercial li-ion batteries are polyvinyledene fluoride (PVDF), ethylene-propylene and a diene (EPDM). These polymers are generally insoluble in water and, thus are dissolved in an organic solvent such as N-methyl pyrrolidone (NMP). The organic solvent additionally serves as a dispersion medium for the active materials. Some disadvantages of using organic solvents are that they have relatively high cost, can possess negative environmental impacts, and pose disposal issues. Further, PVDF is highly unstable and tends to break down at high temperatures.

Known water soluble binders, such as carboxy methyl cellulose (CMC), require a thickening agent to control the viscosity of the binder. Further, they exhibit only marginal adhesion capability. Polytetrafluoroethylene (PTFE) and styrene butadiene rubber (SBR) based water soluble binders also exhibit poor adhesion and do not exhibit good cycle life. Further, SBR binders exhibit high expandability and undesirable agglomeration characteristics resulting in poor dispersion, poor performance, and high electrode resistance.

Accordingly, there is a need for a water soluble binder in rechargeable lithium batteries. This water soluble binder should exhibit good adhesion in the absence of thickening or wetting agents, low resistance and good chemical and electrochemical stability.

SUMMARY

Briefly, the present invention provides a water-soluble binder comprising a poly(acrylonitrile-co-acrylamide) polymer and water.

The invention further includes a battery comprising a positive electrode mix which contains a positive electrode active material, a water soluble binder comprising a poly (acrylonitrile-co-acrylamide) polymer and water, and a conductive additive. The battery also includes a negative electrode mix comprising a negative electrode active material, a water soluble binder comprising a poly(acrylonitrile-co-acrylamide) polymer and water, and a conductive additive. The battery further includes an electrolyte.

The present invention also includes a battery comprising a positive electrode mix which contains a positive active material selected from the group consisting of $LiCoO_2$, $LiNiO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, $LiMn_2O_4$ $LiFePO_4$ coated with graphite and/or carbon and $Li_2Mn_2O_4$. The positive electrode mix also includes a water soluble binder comprising a poly(acrylonitrile-co-acrylamide) polymer and water, as well as a conductive additive or additives selected from the group consisting of carbon black, acetylene black, carbon fibers, coke, high surface area carbon and graphite. The negative electrode mix comprises a negative active material selected from the group consisting of graphite, hard carbon, silicon, tin and lithium titanate. The negative electrode mix also includes, a binder comprising a poly(acrylonitrile-co-acrylamide) polymer and water, as well as the conductive additive or additives. The battery further comprises an electrolyte comprised of a lithium salt in cyclic and linear carbonates.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawing certain embodiments of the present invention. It should be understood, however, that the invention is not limited to the precise arrangements shown. In the drawings.

DETAILED DESCRIPTION OF THE PREFERRED EMBODIMENTS

Figure 1:
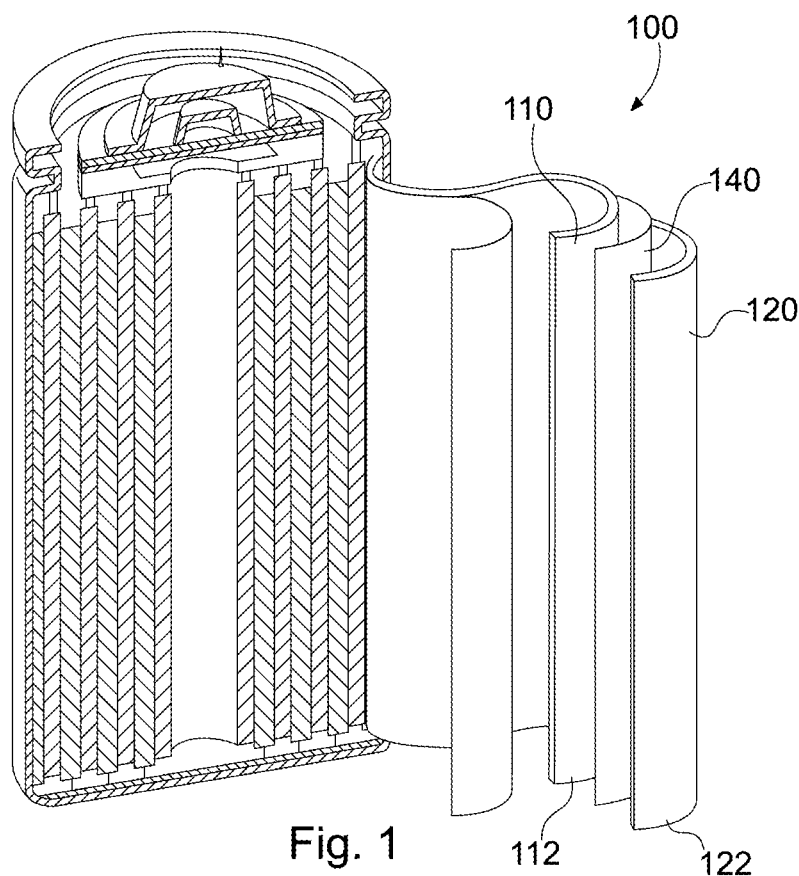
FIG. 1 is a schematic view of a battery formed in a jellyroll configuration according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale.

The following describes particular embodiments of the present invention. It should be understood, however, that the invention is not limited to the embodiments detailed herein. Generally, the following disclosure refers to lithium ion batteries and a water soluble binder for use in lithium ion batteries.

Figure 1A:
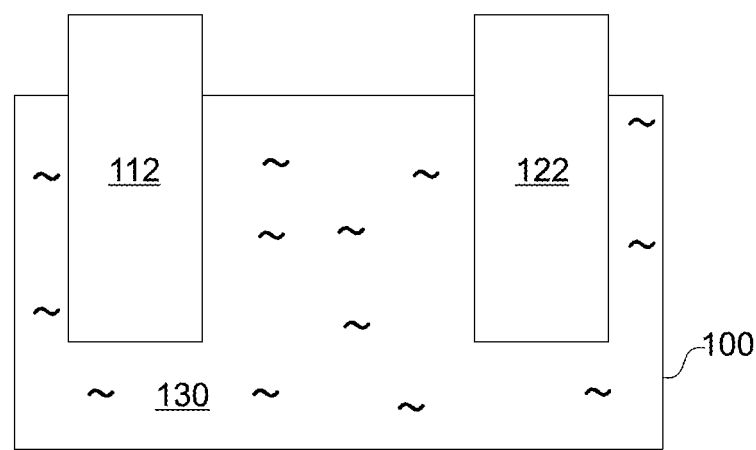
FIG. 1A is a schematic view of the battery of FIG. 1 with the electrolyte.
Figure 2:
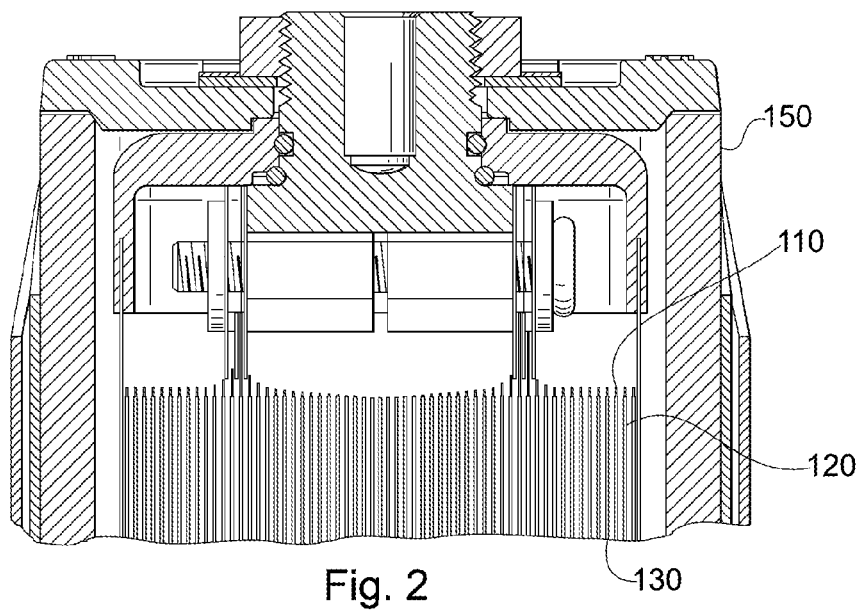
FIG. 2 is a cross-sectional representation of a prismatic electrochemical cell according to an exemplary embodiment of the present invention.

Referring to FIGS. 1 and 1A, a rechargeable battery 100 according to an exemplary embodiment of the present invention includes a positive electrode 112 formed from a positive electrode mix 110, a negative electrode 122 formed from a negative electrode mix 120, and an electrolyte 130. While FIG. 1 illustrates battery 100 formed in a "jellyroll" configuration, those skilled in the art will recognize that other formations, such as, for example, a prismatic configuration, which is illustrated in FIG. 2, may also be used within the teaching of the present invention.

Positive electrode mix 110 exhibits a reduction potential and negative electrode mix 120 has an oxidation potential. Electrolyte 130 transfers ions between positive electrode mix 110 and negative electrode mix 120 within battery 100. Separator 140 separates positive electrode mix 110 from negative electrode mix 120.

Positive electrode mix 110 includes a positive electrode active material selected from the group consisting of $LiCoO_2$, $LiNiO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, $LiMn_2O_4$, $LiFePO_4$ coated with at least one of graphite and carbon and $Li_2Mn_2O_4$, and $LiMPO_4$ where M is one or more of the first row transition-metal cations selected from the group consisting of Fe, Mn, Ni, Ti, Co and combinations thereof. In an exemplary embodiment, the positive electrode active material is about 80-95 percent (by weight) of the positive electrode mix 110.

Positive electrode mix 110 further includes a conductive additive or additives selected from the group consisting of carbon black, acetylene black, carbon fibers, coke, high surface area carbon, graphite and combinations thereof. In an exemplary embodiment, the conductive additive material is about 1-10 percent (by weight) of the positive electrode mix 110.

Positive electrode mix 110 also includes a water soluble binder polymer comprising a poly(acrylonitrile-co-acrylamide) polymer and water. The binder is used to bind the positive electrode active material and the conductive additive together to form slurry. The slurry is coated on an aluminum current collector or a carbon coated aluminum current collector to form positive electrode 112. The slurry pH ranges between about 7 and about 9 for a $LiFePO_4$ based system and for other positive electrode mixes, the pH ranges between about 10 and about 12.

An exemplary poly(acrylonitrile-co-acrylamide) polymer and water binder has the chemical formula:

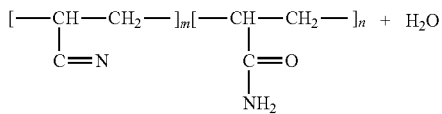

In another exemplary embodiment, the mole ratio of acrylonitrile units to acrylamide units (m:n) is between about 3:1 and 1:1. In another exemplary embodiment, the mole ratio of acrylonitrile units to acrylamide units (m:n) is about 2:1. In an exemplary embodiment, an average molecular weight of the polymer is between about 10,000 and 300,000. In another exemplary embodiment, the average molecular weight of the polymer is between about 100,000 and 200,000. In an exemplary embodiment, the water soluble binder is about 1-10 percent (by weight) of positive electrode mix 110.

The water soluble binder is used to make the slurry in the absence of a thickening agent or any external reagent to control its viscosity. An exemplary binder has a viscosity ranging from 6000-10000 cp. The water soluble binder is also provided in the absence of a wetting agent or any other additives to improve the active material and conductive additive dispersion.

Negative electrode mix 120 comprises a negative electrode active additive or additives material selected from the group consisting of graphite, hard carbon, silicon, tin and lithium titanate. In an exemplary embodiment, the negative electrode active material is about 80-95 percent (by weight) of the negative electrode mix 120.

Negative electrode mix 120 further includes a conductive additive selected from the group consisting of carbon black, acetylene black, carbon fibers, coke, high surface area carbon, graphite and combinations thereof. In an exemplary embodiment, the conductive additive material is about 0-10 percent (by weight) of the negative electrode mix 120.

Negative electrode mix 120 further comprises the water soluble binder as described above with respect to the positive electrode mix 110. In an exemplary embodiment, the water soluble binder is about 1-10 percent (by weight) of the negative electrode mix 120.

An exemplary electrolyte 130 may be comprised of lithium salts such as $LiBF_4$, $LiPF_6$, LiBOB, LiTFSI or LiFSI or mixtures thereof in cyclic and linear carbonates.

Figure 3:
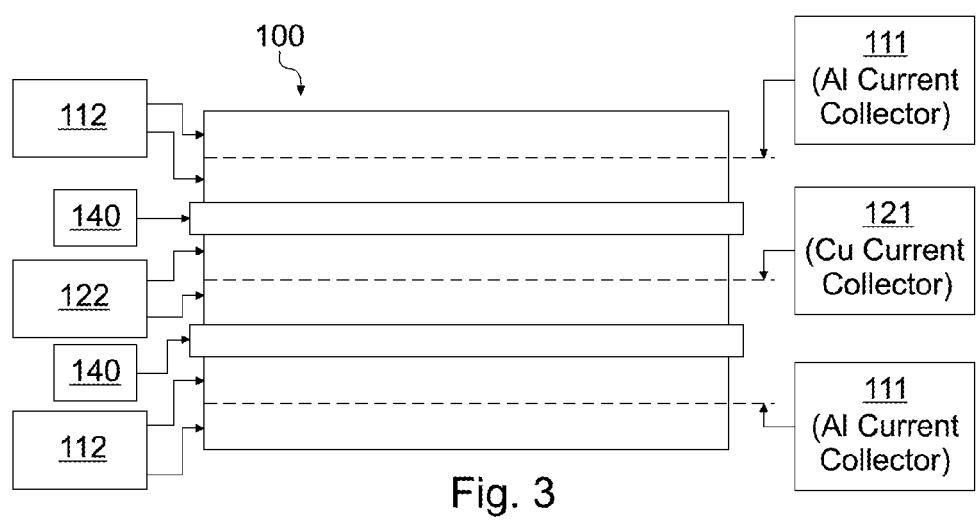
FIG. 3 is a schematic representation of a positive electrode, a separator and a negative electrode-bi-cell configuration of the exemplary embodiment illustrated in FIG. 1.

To form battery 100, positive electrode mix 110 is coated on an aluminum current collector or a carbon coated aluminum current collector 111, forming a positive electrode 112. The negative electrode mix 120 is coated on a copper current collector 121, forming negative electrode 122. Positive electrode 112 and negative electrode 122 are each then compressed or calendared for specific thickness. Electrodes 112, 122 are stacked as shown in FIG. 3. The stack is dried in a vacuum oven until the moisture is below 2000 ppm, and most preferably below 200 ppm. The electrode stack may be inserted into a polyethylene or polypropylene cell housing 150, shown in FIG. 2, and filled with electrolyte 130, forming battery 100. Battery 100 is then charged and discharged to complete the forming process.

EXAMPLES

The following examples are given purely as an illustration and should not be interpreted as constituting any kind of limitation to the invention.

Positive electrode mix 110 was prepared first by dissolving poly (acrylonitrile-co-acrylamide) polymer binder in water. The ratio of binder to water ranges from 15 to 20%. A positive active powder (carbon and/or graphite coated $LiFePO_4$ manufactured by Phostech Lithium, Canada and $LiNi_{1/3}Co_{1/3}Mn_{1/3}O_2$ manufactured by 3M corporation, USA) with an appropriate amount of conductive additive such as for example Super P®, manufactured by Timcal Graphite & Carbon located in Switzerland, was mixed with the binder in water solution for about 2 hrs. The pH of the slurry for $LiFePO_4$ positive mix was between about 7 and about 9 and for $LiNi_{1/3}Co_{1/3}Mn_{1/3}O_2$, the pH range was between about 10 and 12. The homogeneously mixed slurry was then coated on the aluminum current collector or a carbon coated aluminum current collector 111 to form positive electrode 112. Positive electrode 112 was cut into an appropriate size and dried in a vacuum oven until the moisture was below about 1000 ppm and most preferably below about 200 ppm.

Negative electrode mix 120 was prepared first by dissolving poly (acrylonitrile-co-acrylamide) polymer binder in water. The ratio of binder to water ranged from 15% to 20%. A negative active powder (graphite) with an appropriate amount of conductive additive (Super P®) was mixed with the binder in water solution and mixed for about 2 hrs. The pH of the slurry was between about 7 and 9. The homogeneously mixed slurry was then coated on to copper current collector 121 to form negative electrode 122. Negative electrode 122 was cut into an appropriate size and dried in a vacuum oven until the moisture was below about 1000 ppm and most preferably below about 200 ppm.

Figure 4A:
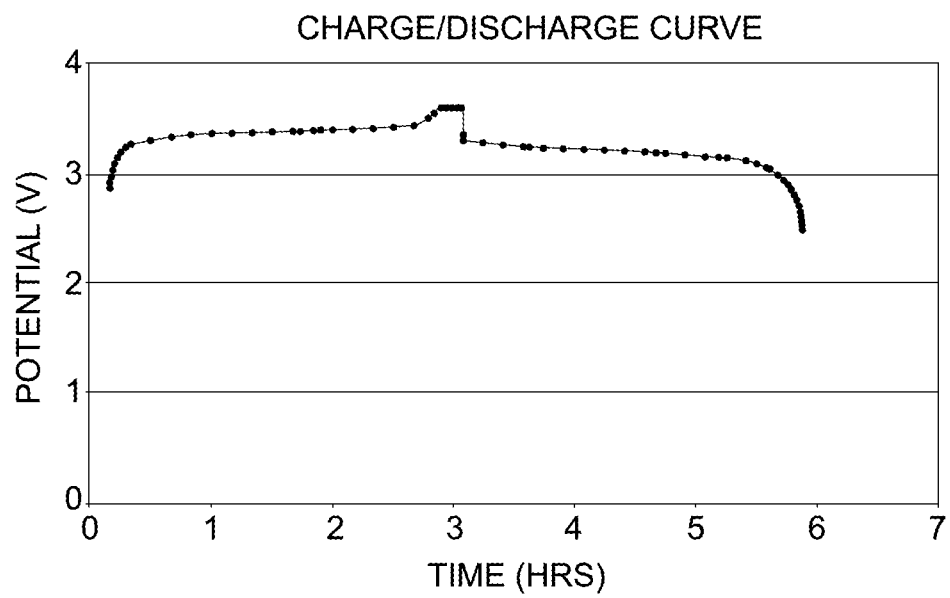
FIG. 4A is a charge/discharge curve for a $LiFePO_4$/Graphite Li-ion cell according to an exemplary embodiment of the present invention.
Figure 4B:
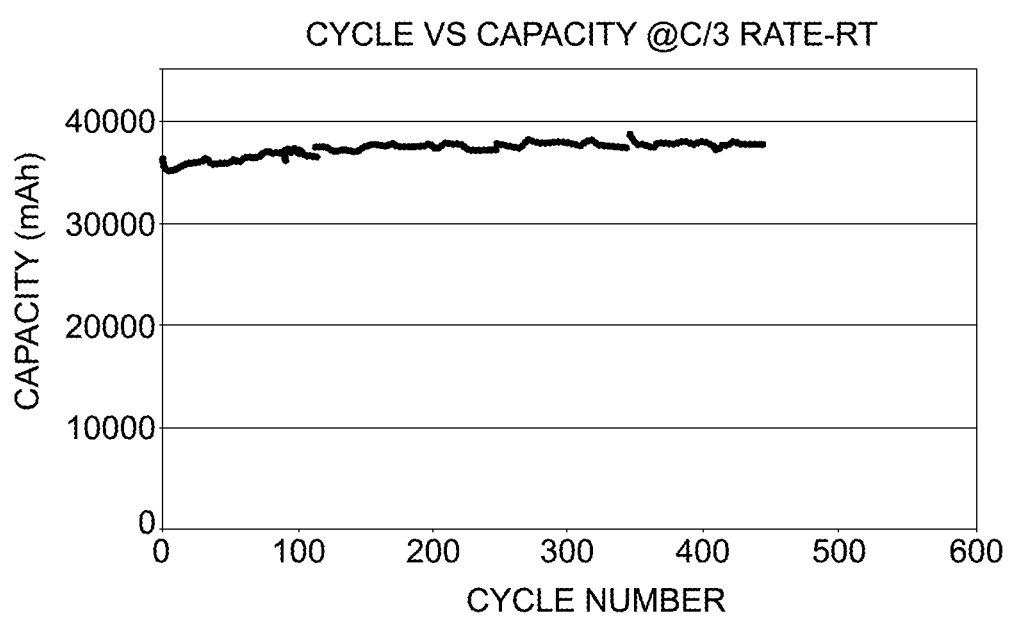
FIG. 4B is a cycle life curve for the $LiFePO_4$/Graphite Li-ion cell whose charge/discharge curve is illustrated in FIG. 4A.
Figure 5A:
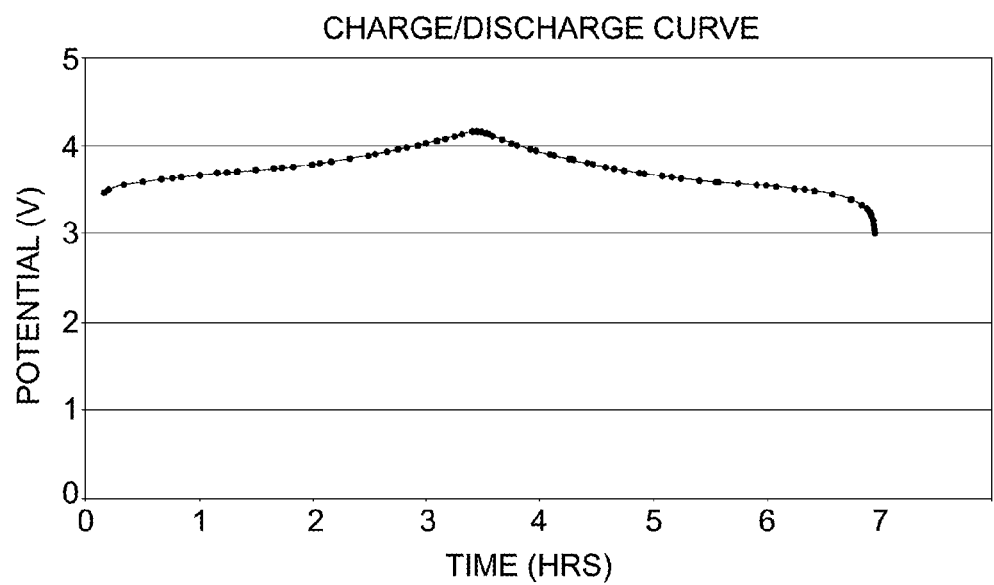
FIG. 5A is a charge/discharge curve for a $LiNi_{1/3}O_{1/3}Mn_{1/3}O_2$/Graphite Li-ion cell according to another exemplary embodiment of the present invention.
Figure 5B:
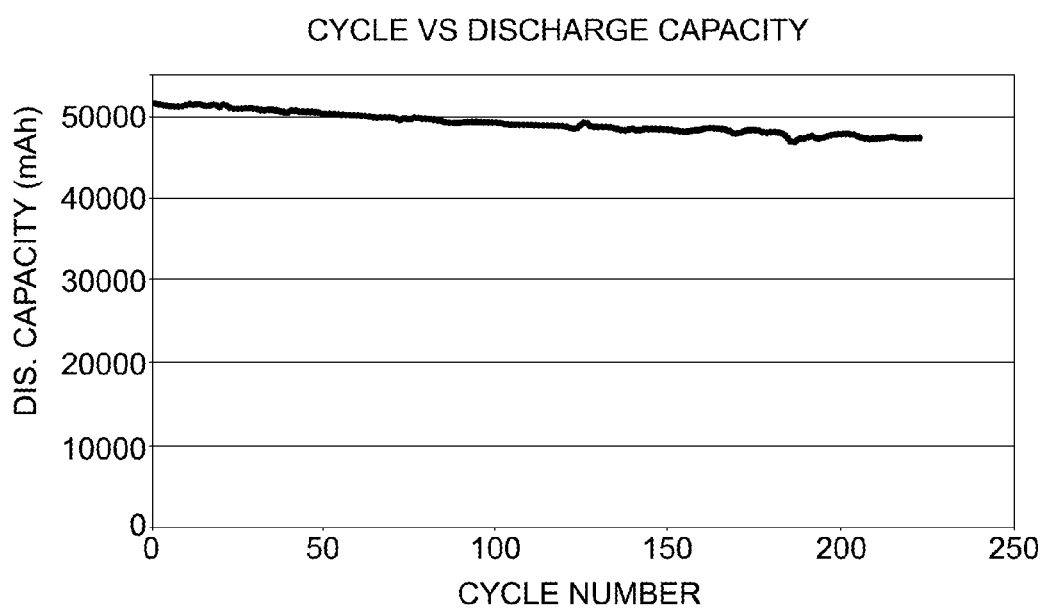
FIG. 5B is a cycle life curve for $LiNi_{1/3}Co_{1/3}Mn_{1/3}O_2$/Graphite Li-ion cell whose charge/discharge curve is illustrated in FIG. 5A.

The cells were built as described in FIGS. 1-3. The cells were then filled with electrolyte 130. The Li-ion cells were in discharged state and had a potential of a few millivolts. FIGS. 4A and 5A each illustrate a charge/discharge curve for a LiFePO$_4$ and LiNi$_{1/3}$Co$_{1/3}$Mn$_{1/3}$O$_2$ cathode and a graphite anode, respectively. FIGS. 4B and 5B each illustrate a cycle life curve for the LiFePO$_4$ and LiNi$_{1/3}$Co$_{1/3}$Mn$_{1/3}$O$_2$ cathode and a graphite anode, respectively.

While the principles of the invention have been described above in connection with preferred embodiments, it is to be clearly understood that this description is made only by way of example and not as a limitation of the scope of the invention.

What is claimed is:

1. A battery comprising:
a positive electrode mix and a negative electrode mix both comprising:
   (i) an electrode active material;
   (ii) a water soluble binder consisting of a polymer and water and having a viscosity in the range of 6,000 to 10,000 centipoise, wherein the water soluble binder is provided in the absence of a thickening agent or any external reagent; and
   (iii) a conductive additive material; and
an electrolyte.

2. The battery according to claim 1, wherein the positive electrode active material comprises between about 80 to 95 percent, by weight, of the electrode mix.

3. The battery according to claim 2, wherein the conductive additive material comprises between about 1 to 10 percent, by weight, of the electrode mix.

4. The battery according to claim 3, wherein the water soluble binder comprises between about 1 to 10 percent, by weight, of the electrode mix.

5. The battery according to claim 1, wherein the electrode active material comprises between about 80 to 95 percent, by weight, of the electrode mix.

6. The battery according to claim 5, wherein the conductive additive material comprises between about 0 to 10 percent, by weight, of the electrode mix.

7. The battery according to claim 6, wherein the water soluble binder comprises between about 1 to 10 percent, by weight, of the electrode mix.

8. The battery according to claim 1, wherein the water soluble binder is provided in the absence of a wetting agent.

9. The battery according to claim 1, wherein the polymer is a poly(acrylonitrile-co-acrylamide) polymer.

10. A battery comprising:
(a) a positive electrode mix comprising:
   a positive active material selected from the group consisting of LiCoO$_2$, LiNiO$_2$, LiNi$_{1/3}$Co$_{1/3}$Mn$_{1/3}$O$_2$, LiNi$_{0.8}$Co$_{0.15}$Al$_{0.05}$O$_2$, Li$_{1+x}$Ni$_{1/3}$Co$_{1/3}$Mn$_{1/3}$O$_2$, LiMn$_2$O$_4$ LiFePO$_4$ coated with one of graphite and carbon and Li$_2$Mn$_2$O$_4$, LiMPO$_4$ where M is one or more of the first row transition-metal cations selected from the group consisting of Fe, Mn, Ni, Ti, Co and combinations thereof;
   a water soluble binder consisting of a polymer and water and having a viscosity in the range of 6,000 to 10,000 centipoise, wherein the water soluble binder is provided in the absence of a thickening agent or any eternal reagent; and
   a conductive additive selected from the group consisting of carbon black, acetylene black, carbon fibers, coke, high surface area carbon and graphite and combinations thereof;
(b) a negative electrode mix comprising:
   a negative active material selected from the group consisting of graphite, hard carbon, silicon, tin and lithium titanate;
   a water soluble binder consisting of a polymer and water and having a viscosity in the range of 6,000 to 10,000 centipoise, wherein the water soluble binder is provided in the absence of a thickening agent or any external reagent; and
   a conductive additive selected from the group consisting of carbon black acetylene black, carbon fibers, coke, high surface area carbon and graphite and combinations thereof; and
(c) an electrolyte comprised of lithium salt in cyclic and linear carbonates.

11. The battery according to claim 10, wherein a mole ratio of acrylonitrile units to acrylamide units is between about 3:1 and 1:1.

12. The battery according to claim 11, wherein the mole ratio of acrylonitrile units to acrylamide units is about 2:1.

13. The battery according to claim 10, wherein an average molecular weight of the polymer is between about 10,000 and 200,000.

14. The battery according to claim 13, wherein the average molecular weight of the polymer is between about 100,000 and 200,000.

15. The battery according to claim 10, wherein the polymer is a poly(acrylonitrile-co-acrylamide) polymer.

* * * * *